127,515

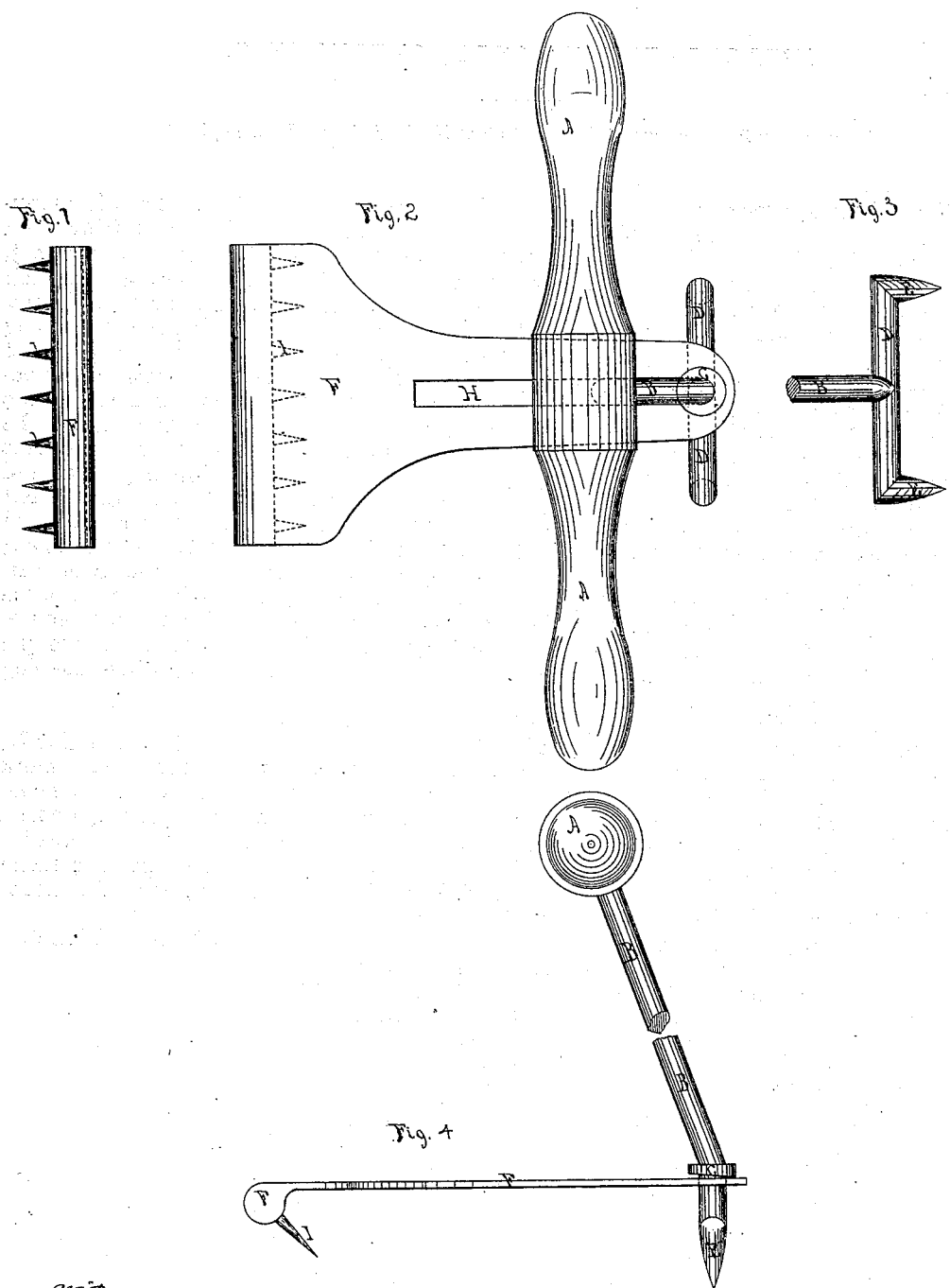

UNITED STATES PATENT OFFICE.

DUDLEY PRAY, OF BOSTON, MASSACHUSETTS.

IMPROVEMENT IN CARPET-STRETCHERS.

Specification forming part of Letters Patent No. 127,515, dated June 4, 1872.

*Know all men by these presents:*

That I, DUDLEY PRAY, of the city of Boston, in the county of Suffolk and Commonwealth of Massachusetts, have invented certain new and useful Improvements in Carpet-Stretchers, of which the following is a true and correct specification:

The nature of my invention consists in having a drag with long, sharp, steel teeth, which penetrate the carpet, and a forked dog, which is used to propel the drag, which has a long shank with slot, in which the dog works. By hooking the teeth of the drag into the carpet, and then "walking it up" with the forked dog, the carpet is stretched to its position so that it may be nailed.

Figure 1 is an end view of the toothed-drag. Fig. 2 is a top view of machine; Fig. 3, side view of a portion of forked dog; Fig. 4, side view of machine with portion of shank broken away.

I construct and operate my invention in the following manner, viz.: I make the drag F of sheet-brass or malleable iron, having the shank six, eight, or ten inches in length, with slot in center, running well down toward the head. I have the head six inches wide, and solid, and in that set the sharp steel teeth, represented by I I in Figs. 1, 2, and 3.

The forked dog is constructed as follows, viz.: I have the cross-arm D, shank B, handle A, and pointed toes E E. The shank and cross-arm are made of wire, thick enough to sustain the force and to fit the slot in the drag F.

To operate my invention I adjust it as represented in Figs. 2 and 4; then setting it on the carpet near the edge, as seen in Fig. 4, when the teeth I I, being slender, pass through the carpet, and without tearing it or in any way injuring it. Then, moving the forked dog up to the end of drag, as seen in Fig. 4, and inclining the top of the shank toward the operator, and setting the toes E E firmly in the floor, press forward with the handle, and the carpet is drawn up to its position. In case it is not quite up, the forked dog may be walked up by leaning the handle to the right or left and turning it slightly, so as to carry forward the toe, which is released, and then set it down; raise and carry forward the other until the carpet is drawn to its place. When the carpet is up, the foot may be pressed upon the head of the drag F and force the teeth I I into the floor, which holds the carpet when the dog may be removed, for nailing.

I claim as my invention—

The drag F having the teeth I and slot H, and the forked dog having the handle A, shank B, cross-arm D, and pointed toes E, when constructed and arranged for conjoint operation, in the manner and for the purpose specified.

In testimony whereof I have signed my name to this specification in the presence of two subscribing witnesses.

DUDLEY PRAY.

Witnesses:
 H. C. DANE,
 JOHN R. BAKER.